United States Patent [19]

Waldmann et al.

[11] Patent Number: 5,071,228

[45] Date of Patent: Dec. 10, 1991

[54] BLACK-WHITE LIQUID CRYSTAL DISPLAY HAVING AN INSULATION LAYER FOR BLOCKING THE DIFFUSION OF SODIUM IONS FROM THE GLASS OF THE CELL PLATE TO THE POLYPHENYLENE OF THE ORIENTATION LAYER

[75] Inventors: Jürgen Waldmann, Schönaich; Stefan Borsig, Stuttgart, both of Fed. Rep. of Germany

[73] Assignee: Nokia Unterhaltungselektronik, Pforzheim, Fed. Rep. of Germany

[21] Appl. No.: 454,753

[22] Filed: Dec. 19, 1989

[30] Foreign Application Priority Data

Dec. 24, 1988 [DE] Fed. Rep. of Germany ....... 3843767

[51] Int. Cl.$^5$ ............................................. G02F 1/13
[52] U.S. Cl. ........................................ 359/63; 359/75; 359/102; 359/79
[58] Field of Search .................... 350/334, 339 R, 337, 350/340, 347 R, 346

[56] References Cited

U.S. PATENT DOCUMENTS

| 4,653,865 | 3/1987 | Kando et al. ................... 350/337 X |
| 4,697,884 | 10/1987 | Amstutz et al. ................... 350/334 |
| 4,759,612 | 7/1988 | Nakatsuka et al. ................. 350/337 |
| 4,930,877 | 6/1990 | Kano et al. ..................... 350/347 E |
| 4,973,137 | 11/1990 | Kozaki ............................ 350/339 R |

FOREIGN PATENT DOCUMENTS

| 0006524 | 1/1988 | Japan .................................. 350/337 |
| 0220221 | 9/1988 | Japan .............................. 350/347 R |
| 0274925 | 11/1988 | Japan .............................. 350/347 R |

OTHER PUBLICATIONS

"A New, Highly Multiplexable Liquid Crystal Display", T. J. Scheffer and J. Nehring, *Appl. Phys. Lett.* 45(10), Nov. 15, 1984, pp. 1021–1023.

"Electro-Optical Performance of a New, Black–White and Highly Multiplexible LIquid Crystal Display", M. Schadt and F. Leenhouts, *Appl. Phys. Lett.* 50(5), Feb. 2, 1987, pp. 236–238.

"The Optical Mode Interference Liquid Crystal Display: Dependence on Material and Cell Parameters", M. Schadt and F. Leenhouts, *SID 87 Digest*, pp. 372–375.

"Scanning Limitations of Liquid-Crystal Displays", P. Alt and P. Pleshko, *IEEE Transactions on Electron Devices*, vol. ED-21, No. 2, Feb. 1974, pp. 146–155.

Primary Examiner—Stanley D. Miller
Assistant Examiner—Huy K. Mai
Attorney, Agent, or Firm—Peter C. Van Der Sluys

[57] ABSTRACT

A black-white liquid crystal display (10) contains a nematic liquid crystal with a twist of 270° between cell plates. The product of the liquid crystal layer thickness and anisotropy of the refractive index is about 0.38. A pretilt of about 15° is present. The polarization directions (P1, P2) have an angle $\beta$ of 45° to the orientation directions (Mo, Mu). This display features a very wide viewing angle range with relatively little dependence of the contrast on the viewing angle and there is an almost complete absence of color shift depending on the viewing angle. Due to the significant enhancement in viewing angle range in relation to contrast and color neutrality compared with all known cells, the display is called "Extended Viewing Angle" display (EVA display). It has a very high multiplexability.

6 Claims, 1 Drawing Sheet

BLACK-WHITE LIQUID CRYSTAL DISPLAY HAVING AN INSULATION LAYER FOR BLOCKING THE DIFFUSION OF SODIUM IONS FROM THE GLASS OF THE CELL PLATE TO THE POLYPHENYLENE OF THE ORIENTATION LAYER

BACKGROUND OF THE INVENTION

1. Field of the Invention

The invention concerns a black-white liquid crystal display. Strictly speaking, such displays are bright-dark displays, since with such displays not only white light but also coloured light without any marked colour shift can be switched.

2. Description of the Prior Art

Black-white liquid crystal displays can be implemented by utilizing different physical effects. Most of these displays use a liquid crystal cell arranged between two crossed polarizers containing a nematic liquid crystal which is provided with a twist as a result of orientation layers on the cell plates and the addition of a chiral compound. The most usual display is the TN display. The twist angle $\phi$ here is 90° and the product $\delta$ of cell thickness d and anisotropy of the refraction index $\Delta n$ have values over 1 $\mu$m. TN displays are low-cost and simple to make. They have good contrast but are not easily multiplexed.

Different display types have been developed to obtain enhanced multiplexability. The best-known of these have an STN double cell, SBE double cell, and the OMI displays. A simple STN cell has a twist of 240° and a $\delta$ value of about 1 $\mu$m. The pretilt $\Theta$ i.e. the position angle of the molecules in relation to the adjacent cell plate is only a very few degrees.

These cells can easily be multiplexed, have less angular dependence on the contrast than TN cells, but are coloured. To offset the colour effect, two STN cells with opposing twists are connected in series, forming a colour-neutralized STN display with a double cell. However, the colour neutrality exists only within a very narrow viewing angle range of about 10°.

A simple SBE cell is described in the paper by T. J. Scheffer and J. Nehring in Apple Phys. Let. 45 (10), 1984, S. 1021-1023 under the title "A new highly multiplexable liquid crystal display". This cell also has a pronounced colour—it actually appears yellow or blue. To obtain colour neutrality by using the supertwisted birefrigence effect, two cells with opposing twists are therefore connected in series, as is the case with STN cells. Each individual SBE cell has a 270° twist, a $>5°$ pretilt and a $\delta$ value of about 0.8 $\mu$m. The multiplexability and the angular dependence on contrast and colour are still better than for STN double cells, but manufacture is considerably more difficult. In addition, this angular independence is still unsatisfactory in spite of the improved angular dependency of the colour effect. STN and SBE cells work with polarizers which are rotated by 30° or 60° angle to the orientation directions.

OMI displays have a very good white effect over a large angle range. However, the angular dependence of the contrast is unsatisfactory. OMI displays have cells with up to a 210 twist and $\delta$ values as low as 0,4 $\mu$m, preferably 0.55 $\mu$m. This sort of cell is described in two papers by M. Schadt and F. Leenhouts under the title "Electro-optical performance of a new black-white and highly multiplexable liquid crystal display" in Apple Phys. Let. 50 (5) 1987, pp 236-238 and under the title "The optical mode interference liquid crystal display: dependence on material and cell parameters" in SID 87 Digest. pp 372-375.

The advantage of these cells is that they can be easily produced and can have multiplex rates of Nmax=1000 lines. Maximum contrast is obtained with crossed polarizers. At least one of these is positioned parallel to an orientation direction. If the angle between the polarization directions is increased by over 90° and if the polarizers are rotated in relation to the orientation directions, the brightness increases but the contrast decreases.

SUMMARY OF THE INVENTION

The invented black-white liquid crystal display has a nematic liquid crystal layer with a twist of at least 240° and is arranged between an upper and a lower cell plate. The cell thickness and the liquid crystal material are chosen to obtain a $\delta$ value no greater than about 0.6. The material of the orientation layer is chosen to cause a pretilt of at least about 7° of the liquid crystal molecules as well as their orientation. One advantage is that the $\delta$ value is between 0.35 and 0.45, the twist is basically 270° and the pretilt is at least about 10°. Optimum multiplexability is then achieved using the aforementioned arrangement when the polarizers are rotated at an angle of about 45° to the orientation directions.

The invented displays are mainly distinguished by unusually low angular dependence on contrast and the white effect. Compared with cells with a similar favourable angular dependence of the contrast, i.e. double STN or SBE cells, the all but non-existent angular dependence of the white effect is worthy of note.

Even at a very shallow viewing angle, there is hardly no detectable change in colour compared with a 90° view onto the display. Due to the very wide viewing angle range with the highly uniform effect, the display according to the invention was given the name of "Extended Viewing Angle Display", abbreviated to EVA display.

With the aforementioned EVA display in a preferred version, multiplex rates of Nmax≈350 lines were obtained. Although this value is lower than that for OMI displays, it is however higher than other cells previously implemented. With EVA displays having a twist angle of 360°, significantly higher multiplex rates were obtained than 350 lines. However, this type of cell suffered from a previously insufficient optical homogeneity.

For high optical homogeneity, it is advantageous to select the highest possible pretilt. This should be over 20° for a twist of 360°. Such a high twist angle can be obtained with stability using SiO vapour-deposited at an incline. For displays with a lower twist, it is however preferable to use polyphenylene as the material for the orientation and pretilt layers since this material can be applied using the usual spin-coating process, i.e. a process which is also used to apply other layers, e.g. photoresist layers, during the manufacturing process of liquid crystal displays. Pretilt angles up to 24° are also obtainable with polyphenylene if the process is carried out with great care.

DETAILED DESCRIPTION OF THE PREFERRED EMBODIMENT

Figure 1:
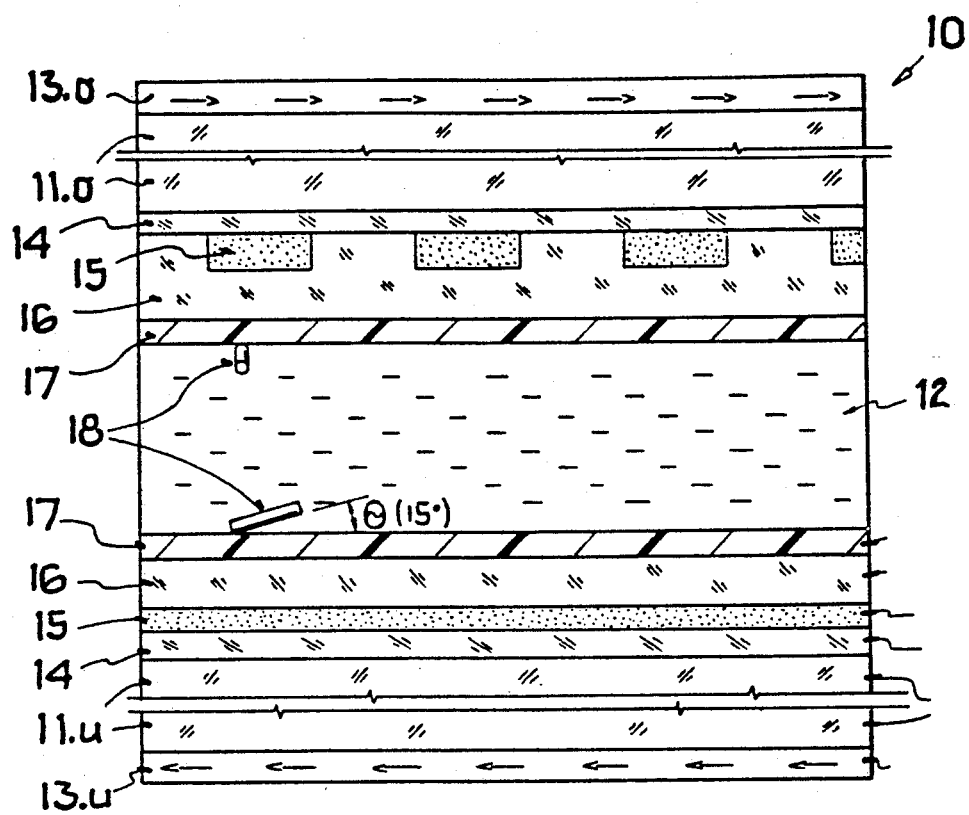
FIG. 1 Schematic section through a liquid crystal display with the effect of "Extended Viewing Angle" (EVA display)

The section through an EVA display (10) as depicted in FIG. I is nor drawn to scale for the purposes of illustration. Therefore, an upper cell plate 11.o and a bottom cell plate 11.u and a liquid crystal layer 12 are represented with similar thicknesses although the thickness of the cell plates is about 1.1 mm, and the thickness of the liquid crystal layer is only 4 μm.

Each cell plate bears a polarizer on the side opposite the liquid crystal layer, i.e. the upper cell plate 11.o has an upper polarizer 13.o and the bottom cell plate 11.u has a bottom polarizer 13.u. The two polarizers are crossed in relation to each other at under 90° and are at 45° to the orientation directions described below. This is represented by arrows which point in the opposite direction for the upper polarizer 13.o than the arrows for the bottom polarizer 13.u.

On the side facing the liquid crystal layer 12, the two cell plates each bear four layers: firstly a barrier layer 14 made of $SiO_2$, an electrode layer 15 with structured electrodes made of ITO, then an insulation layer 16 composed of $SiO_2$ as for the barrier layer 14, and finally an orientation layer 17 made of polyphenylene.

The barrier layer 14 is a thin layer applied by the manufacturer of the ITO layer. Its function is to prevent sodium ions from using out of the glass of the cell plates into the ITO. However, it has been found that this barrier layer 14 reduces the diffusion of sodium ions to such an extent that the ITO layer does not suffer, but that the same number of sodium ions as before can diffuse through, that an important property of the polyphenylene of the orientation layer 17 suffers, i.e. the property of being capable to assume a high pretilt Θ. In order to prevent the diffusion of sodium ions as far as possible, the insulation layer 16 is used. This also contributes to the fact that there is a good electrical insulation of the electrodes in the electrode layer 15 with regards the liquid crystal of the liquid crystal layer 12.

The liquid crystal contains a nematic material. In the version exemplified, the material is a liquid crystal mixture 4940 made by Hoffmann-La Roche having an anisotropy of the refraction index of about 0.094. This crystal receives an admixture of 1.75% chiral doping material CB 15, also made by Hoffmann-La Roche. The thickness d of the liquid crystal layer is 4 μm, as mentioned above. The value 0.376 is thus obtained from the product δ from the thickness d and anisotropy of the refractive index Δ n.

The polyphenylene layer forming the orientation layer 17 is rubbed with a velvet roller to obtain not only the aforementioned pretilt Θ but also an orientation of the adjacent liquid crystal molecules 18. The orientation direction for the molecules 18 towards the bottom cell plate 11.u is designated Mu in FIG. 2, whereas the orientation direction towards the upper cell plate 11.o is designated as Mo.

The two directions are at right angles to each other. Between the two liquid boundaries, the molecules 18 of the liquid crystal layer 12 are aligned to the right, in plan view counterclockwise, twisted by an angle φ of 270°. However, this only applies as long as there is no driving voltage applied to the electrodes of the two electrode layers 15. If an electric field acts on the liquid crystals, they orient themselves in parallel to the latter, whereby the aforementioned twist fails to occur.

By means of the two polarizers 13.o and 13.u, a black/white effect is obtained. If no voltage is applied, the liquid crystal layer 12 converts linear-polarized light entering from one of the two polarizers into circular-polarized light. This caused light to be emitted through the other polarizer. If, however, the cell is driven, i.e. the liquid crystal molecules 18 will have aligned themselves in the electrical field between the electrodes, the impinging linear-polarized light remains unchanged and for this reason is blocked by the other polarizer. Accordingly the driven areas appear dark. At a viewing angle at right angles to the cell plane, the bright-dark contrast is about 10:1 to 12:1. The colour effect corresponds to a white with a very slight blue hue. This very good white effect remains unchanged even if the display is viewed from a very shallow angle. The very good contrast and white properties are largely independent of the viewing angle, as mentioned above, and resulted in the name given to the display (EVA- = Extended Viewing Angle).

Figure 2:
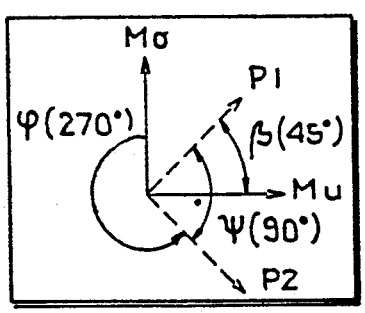
FIG. 2 Schematic plan view of an EVA display to illustrate angles between the orientation and polarizer direction.

It has been found that the multiplexability of the display is strongly dependent on the direction of the polarizers to the orientation direction. In FIG. 2 the polarization directions are designated P1 and P2.

Figure 3:
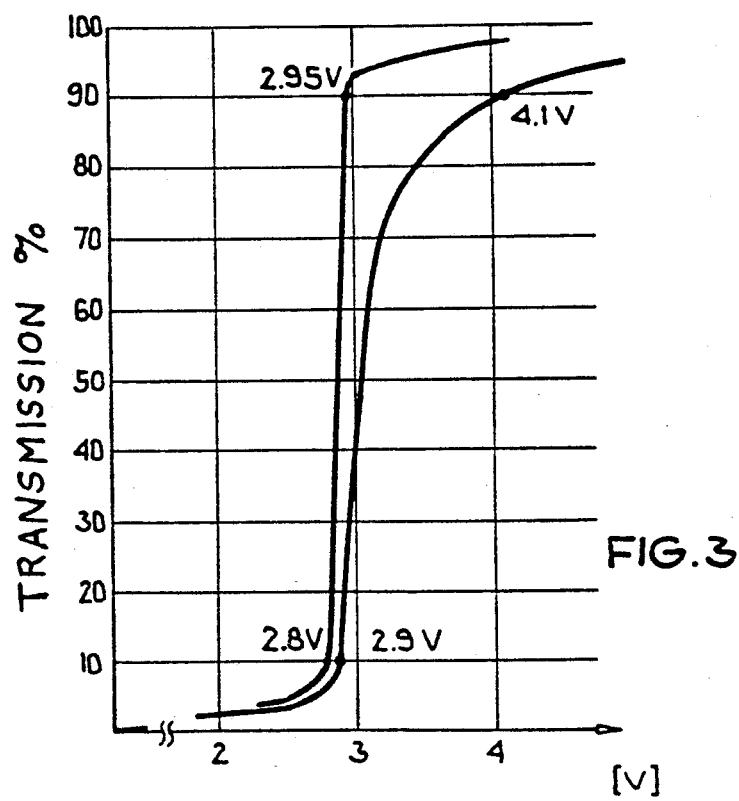
FIG. 3 Graph representing the transmission curve as a function of voltage for two EVA displays with different polarizer arrangements (relative transmission).

They enclose the Φ angle of 90° and are twisted at an angle β of 45° to the orientation directions Mu and Mo. FIG. 3 shows the transmission voltage characteristic for a display according to the version exemplified in FIGS. 1 and 2. The maximum transmission is set to the value 100%. 10% of the transmission is obtained at a driving voltage of 2.8 V and 90% at 2.95 V. According to the formula of Alt and Pleshko (see IEEE Trans. Electron. Devices ED 21, 146, 1974, 146), this results in a multiplex rate Nmax of 350 which means that, at an image refreshment rate of 50 Hz, 350 lines can be drive in multiplex mode, whereby it is possible to switch each line between 10% and 90% of transmission.

What is surprising about the characteristic depicted in FIG. 3 for the display according to the version exemplified is that the characteristic above 90% of transmission has a kink. The kink in the characteristic is previously unknown in other displays. Characteristics typically have a curve as plotted in FIG. 3 for an EVA display which is differentiated from the version exemplified by the fact that the polarization directions P1 and P2 are parallel to the orientation directions and that the angle β is 0° or 90° instead of 45°. The multiplex rate for the display with polarizers arranged in this way is significantly lower than that for the display with polarizers twisted by 45° to the orientation directions.

As already mentioned at the beginning, it is a well-known process to twist polarizers in relation to the orientation directions. However, for OMI displays, the deviation is only a few degrees whereas for STN and SBE displays, this can be 30° to 60°. A deviation of 45° leading to optimum results is not previously known and neither is a kinked characteristic.

A more preferable solution than the EVA display according to the version exemplified seems to be one which differs from the version exemplified in that the twist is 360° instead of 270°. In general, transmission increases as twist increases and the dependence on the contrast of the viewing angle is reduced. For this reason, the twist should not be less than 240°. Multiples of 90° are preferred since at these values, i.e. at 270° and 360°, contrast is optimum. Using a test cell with a 360° twist, however, the problem arose that within a short operating time, areas formed with a different twist. This is explained by the fact that the pretilt produced by the polyphenylene layer is reduced by diffusing sodium ions below a value which is necessary to stabilize a homogeneous twist across the full surface of the display. It is assumed that, by enhancing the processing of the polyphenylene or by using an inclined vapour-deposited SiO coating as an orientation layer, a pretilt can be maintained for the full required operating time of an EVA display sufficient to stabilize a twist of 360°. The previously used polyphenylene was procured from the British company ICI under the designation of "HI-TILT". It was applied by means of the usual spin-coating and rubbed with a velvet roller to obtain the orientation effect.

The value $\delta$ should not be greater than about 0.6 $\mu$m since otherwise the deviation from a white colour effect is too great. The smaller this value, the less the display changes the colour of the impinging light. However, transmission becomes increasingly poorer. At the value $\delta = 0.2$ $\mu$m, transmission is only about ¼ of that of the described cell with an otherwise similar structure.

In order to stabilize satisfactorily a twist of 240°, the pretilt must be at least about 7°. The higher it is, the less critical is the sensitivity of the display in relation to changes in layer thickness or temperature. It is known that in twisted nematic liquid crystals, focal-tapered textures may occur if the relationship between the layer thickness and the pitch attains values which are difficult to obtain experimentally. The pitch is that amount which is obtained in a liquid crystal by a chiral 269 compound. Only so much dopant is added until pitch P is greater than the layer thickness d of the liquid crystal layer 12. The problem is that pitch is temperature-dependent. The greater the pretilt, the greater the area of the quotient d/P can be without focal-tapered textures occurring. The display is then very stable against changes in thickness and temperature. At a twist of 270°, the pretilt is preferably at least about 10°; in the version exemplified, it is about 15°.

Layers on which it is difficult to diffuse sodium ions can be neglected if a sodium-free glass, e.g. a borosilicate glass or a silica glass is used instead of the usual glass used for liquid crystal cells.

The distance between the two cell plates is usually adjusted by means of spacers between the plates. The plates are held together by an adhesive edge made of a usual adhesive.

What is claimed is:

1. Black-white liquid crystal display (10) with a liquid crystal cell arranged between two crossed polarizers (13.o, 13.u) with
    an upper and lower cell plate (11.o, 11.u) and an upper and lower orientation layer (17) for providing an orientation direction (M.o, M.u) for adjacent liquid crystal molecules (18) of a layer (12) of a nematic liquid crystal between the cell plates, the molecules are twisted in relation to each other by the addition of a chiral compound, whereby the molecules adjoining the cell plates are oriented approximately parallel to the orientation direction of the adjacent orientation layer in each case, thereby producing a twist,
    characterized by the fact that
    the product of the distance between the plates and the anisotropy of the refractive index is not greater than about 0.6 $\mu$m
    the twist is at least 240°,
    the orientation layer (17) is formed of polyphenylene which causes a pretilt of at least 7° in the liquid crystal molecules (18) and orients the molecules, and
    between the orientation layer and the associated cell plate (11.o, 11.u) there is an insulation layer (16) for blocking the diffusion of sodium ions from the glass of the cell plate to the polyphenylene.

2. Display according to claim 1, characterized by the fact that the value of said product is between 0.35 and 0.45 $\mu$m.

3. Display according to claim 1, characterized by the fact that the twist is approximately 270° and the pretilt at least approximately 10°.

4. Display according to claim 1, characterized by the fact that the twist is approximately 360° and the pretilt at least approximately 20°.

5. Display according to claim 1, characterized by the fact that the twist is selected from a group of angles including 270° and 360° and the polarizers (13.o, 13.u) are rotated at an angle of about 45° in relation to the orientation directions (M.o, M.u.).

6. Display according to claim 1, characterized by the fact that the cell plates (11.o, 11.u) are composed of sodium-free glass.

* * * * *